US011630970B2

(12) United States Patent
Kunze et al.

(10) Patent No.: US 11,630,970 B2
(45) Date of Patent: Apr. 18, 2023

(54) DATA CARRIER, READING METHOD AND SYSTEM UTILIZING SUPER RESOLUTION TECHNIQUES

(71) Applicant: Ceramic Data Solutions GmbH, Gmunden (AT)

(72) Inventors: Martin Kunze, Gmunden (AT); Christian Pflaum, Bernried (DE)

(73) Assignee: Ceramic Data Solutions GmbH, Gmunden (AT)

( * ) Notice: Subject to any disclaimer, the term of this patent is extended or adjusted under 35 U.S.C. 154(b) by 0 days.

(21) Appl. No.: 17/938,171

(22) Filed: Oct. 5, 2022

(65) Prior Publication Data

US 2023/0028724 A1 Jan. 26, 2023

Related U.S. Application Data

(63) Continuation of application No. PCT/EP2021/056661, filed on Mar. 16, 2021.

(51) Int. Cl.
*G06K 7/14* (2006.01)
*G02B 21/16* (2006.01)
*G02B 21/36* (2006.01)
*G02B 27/58* (2006.01)

(52) U.S. Cl.
CPC ........... *G06K 7/1439* (2013.01); *G02B 21/16* (2013.01); *G02B 21/365* (2013.01); *G02B 27/58* (2013.01)

(58) Field of Classification Search
CPC .... G06K 7/1439; G02B 21/16; G02B 21/365; G02B 27/58

USPC .......................................................... 348/79
See application file for complete search history.

(56) References Cited

U.S. PATENT DOCUMENTS

| | | |
|---|---|---|
| 4,069,487 A | 1/1978 | Kasai et al. |
| 4,214,249 A | 7/1980 | Kasai et al. |
| 4,556,893 A | 12/1985 | Rinehart et al. |
| 4,797,316 A | 1/1989 | Hecq et al. |
| 5,063,556 A | 11/1991 | Chikuma |
| 5,761,111 A | 6/1998 | Glezer |
| 6,039,898 A | 3/2000 | Glushko |
| 6,120,907 A | 9/2000 | Tahon et al. |
| 6,133,986 A | 10/2000 | Johnson |
| 6,143,468 A | 11/2000 | Ohno et al. |
| 6,171,730 B1 | 1/2001 | Kuroda et al. |
| 6,340,543 B1 | 1/2002 | Nagamura et al. |

(Continued)

FOREIGN PATENT DOCUMENTS

| | | |
|---|---|---|
| CN | 110653494 A | 1/2020 |
| DE | 19724214 | 12/1998 |

(Continued)

OTHER PUBLICATIONS

Gustafsson, Mats G.L., "Nonlinear Structured-Illumination Microscopy: Wide-Field Fluorescence Imaging with Theoretically Unlimited Resolution," PNAS, vol. 102, No. 37, Sep. 13, 2005, pp. 13081-13086.

(Continued)

*Primary Examiner* — Allen C Wong
(74) *Attorney, Agent, or Firm* — Lewis & Reese, PLLC

(57) ABSTRACT

The present invention relates to a method of reading out information from a data carrier and to a data carrier utilizing the concept of structured-illumination microscopy or saturated structured-illumination microscopy.

19 Claims, 7 Drawing Sheets

(56) References Cited

U.S. PATENT DOCUMENTS

| | | |
|---|---|---|
| 10,181,336 B1 | 1/2019 | Georgiou et al. |
| 10,315,276 B2 | 6/2019 | Wagner et al. |
| 10,719,239 B2 | 7/2020 | Rowstron et al. |
| 2003/0186624 A1 | 10/2003 | Koike et al. |
| 2003/0189228 A1 | 10/2003 | Ieong et al. |
| 2005/0181089 A1 | 8/2005 | Ogawa et al. |
| 2006/0119743 A1 | 6/2006 | Lin |
| 2006/0120262 A1 | 6/2006 | Kiyono |
| 2006/0147841 A1 | 7/2006 | Ohmi et al. |
| 2008/0320205 A1 | 12/2008 | Lunt et al. |
| 2009/0207395 A1 | 8/2009 | Kasono |
| 2009/0245077 A1 | 10/2009 | Ueda et al. |
| 2010/0040960 A1 | 2/2010 | Piao et al. |
| 2010/0135147 A1 | 6/2010 | Bard et al. |
| 2010/0151391 A1 | 6/2010 | Neogi et al. |
| 2010/0289186 A1 | 11/2010 | Longo et al. |
| 2011/0318695 A1 | 12/2011 | Hwang et al. |
| 2015/0077535 A1* | 3/2015 | Izatt .......................... G02B 5/18 348/79 |
| 2015/0302926 A1 | 10/2015 | Shiozawa et al. |
| 2015/0382476 A1 | 12/2015 | Zenon et al. |
| 2016/0118077 A1 | 4/2016 | Lunt et al. |
| 2016/0199935 A1 | 7/2016 | Chen et al. |
| 2019/0273025 A1 | 9/2019 | Chen et al. |
| 2019/0324240 A1 | 10/2019 | Shroff et al. |
| 2019/0353912 A1 | 11/2019 | Chen et al. |
| 2020/0142171 A1* | 5/2020 | Xiong ................ G02B 27/0955 |

FOREIGN PATENT DOCUMENTS

| | | |
|---|---|---|
| DE | 102014118497 | 6/2017 |
| EP | 3031785 | 10/2018 |
| EP | 3955248 | 2/2022 |
| EP | 4044182 | 8/2022 |
| JP | H02-215587 | 8/1990 |
| JP | H02-277689 | 11/1990 |
| JP | 2004-062981 A | 2/2004 |
| JP | 3913319 B2 | 5/2007 |
| JP | 6689067 | 4/2020 |
| KR | 20010112497 A1 | 12/2001 |
| WO | 91/13440 | 9/1991 |
| WO | 2021/028035 | 2/2021 |
| WO | 2022/002418 | 1/2022 |
| WO | 2022/002444 | 1/2022 |
| WO | 2022/033701 | 2/2022 |
| WO | 2022/033800 | 2/2022 |

OTHER PUBLICATIONS

International Search Report and Written Opinion regarding corresponding PCT Application No. PCT/EP2021/056661, dated Jan. 24, 2022.

Watanabe M., et al., "Three-Dimensional Optical Data Storage in Vitreous Silica," Japanese Journal of Applied Physics, JP, vol. 37, No. 12 B, part 02, Dec. 15, 1998.

Glezer, E. N., et al., "Three-Dimensional Optical Storage Inside Transparent Materials," Optics Letters, vol. 21, No. 24, Dec. 15, 1996, 3 pages.

Glezer E. N., et al., "Ultrafast-Laser Driven Micro-Explosions in Transparent Materials," Appl. Phys., Lett. 71 (7), Aug. 18, 1997, 3 pages.

Benton, David M., "Multiple Beam Steering Using Dynamic Zone Plates on a Micro-Mirror Array," Optical Engineering, 57 (7), 2018, 13 pages.

Qi, Z.B., et al., "A Comprehensive Study of the Oxidation Behavior of Cr2N and CrN Coatings," 544, 2013, pp. 515-520.

Webster's Ninth New Collegiate Dictionary; Merrian-Webster Inc.; Springfield, Mass, USA; 1990 (no month); excerpt p. 224.

"Glass Composition, Glass Types," retrieved Dec. 17, 2020 from website ://glassproperties.com/glasses.

Invitation to Pay Additional Fees regarding corresponding PCT Application No. PCT/EP2021/056661, mailed Nov. 29, 2021.

Haight, Richard, et al., "High Resolution Material Ablation and Deposition with Femtosecond Lasers and Applications to Photomask Repair," Journal of Modern Optics, Nov. 10-Dec. 15, 2004, vol. 51, No. 16-18, pp. 2781-2796.

Morishige, Yukio, "High Accuracy Laser Mask Repair Technology Using ps UV Solid State Laser," Second International Symposium on Laser Precision Microfabrication, Proceedings of SPIE, vol. 4426, 2002, pp. 416-423.

Venketakrishnan, K., et al., "Laser Writing Techniques for Photomask Fabrication Using a Femtosecond Laser," Applied Physics A Materials Science & Processing, vol. 74, 2002, pp. 493-496.

\* cited by examiner

DATA CARRIER, READING METHOD AND SYSTEM UTILIZING SUPER RESOLUTION TECHNIQUES

CROSS REFERENCE TO RELATED APPLICATIONS

This is a continuation of International (PCT) Application Serial No. PCT/EP2021/056661, filed Mar. 16, 2021, to which priority is claimed, and which is incorporated by reference in its entirety.

INTRODUCTION

The present invention relates to a method of reading out information from a data carrier and to a data carrier utilizing the concept of structured-illumination microscopy (SIM) or saturated structured-illumination microscopy (SSIM).

It is estimated that, on average, humans generate about 2.5 quintillion bytes per day. While a large portion of said data may be generated for short-term use only, the demand for a long-term data storage is increasing on a day by day basis. Apparently, state of the art data carriers such as flash, hard disc drives (HDD) and magnetic tape are far from ideal in terms of long-term storage. Thus, companies like Microsoft are currently exploring alternative techniques for long-term storage technologies (see, for example, the so-called "Project Silica" and U.S. Pat. No. 10,719,239).

A different technique for a long-term storage of information has been described in Int'l (PCT) Published Patent Application WO 2021/028035. Said technique is based on the use of a ceramic substrate coated with a layer of a different material and encoding information on said coated substrate by using, e.g., a laser in order to manipulate localized areas of said coated substrate. This technique has proven to allow for information storage which is highly resistant to moisture, electromagnetic fields, acidic and corrosive substances, etc. such that the encoded writable ceramic plate provides a durability which is unavailable from other commonly used information storage media. While experiments have shown that extremely small structures (e.g., in the form of a QR code) may be generated in these ceramic data carriers, it may be challenging to optically resolve these tiny structures when again decoding the encoded information due to the well-known limits caused by diffraction.

SUMMARY

It is thus an object of the present invention to provide an improved data carrier for long-term data storage with an increased data storage capacity.

This object is achieved by utilizing SIM or SSIM, a technique which has been described several years ago (see, e.g., Mats G. L. Gustafsson, Nonlinear Structured-Illumination Microscopy: Wide-Field Fluorescence Imaging with Theoretically Unlimited Resolution, PNAS, Sep. 13, 2005, Vol. 102, No. 37, pages 13081-13086) and which has been shown to reach optical resolutions far beyond the diffraction limit mainly for microscopic applications in biology and medicine. SSIM is based on two principles, namely on structured-illumination microscopy on the one hand, which utilizes illumination containing a spatial frequency that allows for identifying structures beyond the classical resolution limit by analyzing the generated Moiré fringes, and an emission rate depending nonlinearly on the illumination intensity due to saturation on the other hand. In order to apply SSIM, though, a photoluminescent or preferably a fluorescent material is required.

The present invention suggests different ways to implement such photoluminescent or fluorescent material.

According to a first aspect of the present invention, the photoluminescent or fluorescent material is only introduced during the process of reading out information from the data carrier, whereas the data carrier as such can, in essence, still be identical to the data carriers described in Int'l (PCT) Published Patent Application WO 2021/028035, which is hereby incorporated by reference, in particular with regard to any disclosure as to features of the data carrier (or information storage medium), its preferred materials and its method of manufacture.

In accordance with this first aspect, the present invention relates to a method of reading out information from a data carrier. The method comprises providing a structured-illumination microscopy (SIM) device or a saturated structured-illumination microscopy (SSIM) device, the device having a sample support for supporting and/or mounting a sample during microscopy, which sample support comprises a layer of a photoluminescent, preferably fluorescent, material. The method further comprises providing a data carrier. Said data carrier comprises a transparent ceramic (or glass ceramic or glass) substrate and a coating layer provided on the transparent ceramic substrate, wherein the material of the coating layer is different from the material of the ceramic substrate and wherein the coating layer comprises a plurality of recesses encoding information. The information may be encoded in an analog format (using, e.g., letters, symbols, photographs, pictures or other graphics) or in a digital format (e.g., as a QR code or utilizing more complex matrix codes as those described in Int'l (PCT) Published Patent Application WO 2022/002444, which is hereby incorporated by reference in its entirety). The method further comprises placing the data carrier on the layer of photoluminescent (or fluorescent) material of the sample support, acquiring SIM or SSIM images from the layer of photoluminescent (or fluorescent) material of the sample support through the data carrier, and processing the SIM or SSIM images in order to decode the information encoded on the data carrier. Acquiring and processing the SIM or SSIM images is performed as described in the above-mentioned article by Gustafsson.

In essence, the present invention utilizes the optical transparence of the ceramic substrate and the light reflecting and/or absorbing properties of the coating layer at portions, where no recesses are present, to allow for the generation of a photoluminescent or fluorescent response only at those portions of the data carrier where recesses are present. At these portions, light from the SIM or SSIM device is transmitted through the data carrier, excites the photoluminescent or fluorescent material of the sample support, which photoluminescent or fluorescent material again emits a response, which response is transmitted through the transparent ceramic substrate to the sensor of the SIM or SSIM device. Accordingly, each recess behaves in the same manner as a similarly shaped and sized block of photoluminescent or fluorescent material.

The skilled person will understand that the ceramic substrate need be transparent for both the excitation and the emission wavelengths of the photoluminescent or fluorescent material. The ceramic substrate thus preferably transmits at least 10%, preferably at least 30%, more preferably at least 50%, even more preferably at least 70% and most preferably at least 90% of the incident electromagnetic power at the excitation and the emission wavelengths. The excitation and the emission wavelengths may range from UV (100 nm-400 nm) to visible light (400 nm-780 nm) to near-infra-red spectrum (780 nm-5000 nm).

Similarly, the material of the coating layer should be sufficiently light absorbing or light reflecting for at least either of the excitation and the emission wavelength of the photoluminescent or fluorescent material. The coating layer preferably absorbs and/or reflects at least 10%, preferably at least 30%, more preferably at least 50%, even more preferably at least 70% and most preferably at least 90% of the incident electromagnetic power at the excitation and the emission wavelengths. The excitation and the emission wavelengths may range from UV (100 nm-400 nm) to visible light (400 nm-780 nm) to near-infra-red spectrum (780 nm-5,000 nm).

Different techniques may be employed in order to measure and/or calculate the transmission, absorption and reflection properties of the layers of the data carrier. For example, the transmission, absorption and reflection at a certain wavelength may be measured separately for the entire data carrier and for the substrate only which will allow to calculate the corresponding optical properties of the coating layer.

Preferably, the data carrier is placed on the layer of photoluminescent or fluorescent material of the sample support with a coating layer facing the layer of photoluminescent or fluorescent material of the sample support. This will increase the optical contrast as the borders or walls of the recesses in the coating layer are provided directly adjacent to the optically active material. However, the data carrier may also be placed upside down on the sample support. In this case, however, it is preferred that the thickness of the transparent ceramic substrate be as small as possible.

It is further preferred that the surface of the layer of photoluminescent or fluorescent material of the sample support and the surface of the data carrier facing the layer of photoluminescent or fluorescent material of the sample support are substantially planar with a maximum gap between the surface of the layer of photoluminescent or fluorescent material of the sample support and the surface of the data carrier facing the layer of photoluminescent or fluorescent material of the sample support being at most 10 nm, preferably at most 5 nm and more preferably at most 2 nm.

Preferably, each recess in the coating layer has a depth which is substantially equal to the thickness of the coating layer. Thus, the light absorbing and/or light reflecting material of the coating layer is substantially completely removed at each recess allowing light to pass through the transparent ceramic substrate unobstructedly while at the same time not mechanically affecting the transparent ceramic substrate during, e.g., the ablation process. Alternatively, each recess in the coating layer may have a depth which is greater than the thickness of the coating layer to ensure that all material of the coating layer is, indeed, completely removed at each recess and to, at the same time, simplify the ablation process in terms of its required precision. It is, however, preferred that each recess extends by at most 1%, preferably by at most 0.1% and even more preferably by 0.01% of the thickness of the ceramic substrate into said substrate.

Preferably, the thickness of the coating layer is at most 100 nm, more preferably at most 30 nm and most preferably at most 10 nm.

Preferably, the thickness of the ceramic substrate is at most 2 mm, more preferably at most 1 mm, more preferably at most 200 µm, more preferably at most 100 µm and even more preferably at most 50 µm.

Preferably, the maximum dimension of the cross-section of each recess perpendicular to its depth is at most 250 nm, preferably at most 100 nm, preferably at most 50 nm, more preferably at most 30 nm and most preferably at most 20 nm. While each recess may, generally, have any shape it is particularly preferred to provide substantially cylindrical recesses with a circular cross-section.

The SIM or SSIM device to be used for the inventive method may be a standard SIM or SSIM device having the particular sample support comprising a layer of a photoluminescent or fluorescent material. A standard SIM or SSIM device may also be upgraded in the context of the inventive method by arranging or mounting the layer of photoluminescent or fluorescent material on the standard sample support of the standard SIM or SSIM device.

In general, various photoluminescent or fluorescent materials may be employed in the context of the present invention. Of course, the excitation and emission wavelength of the photoluminescent or fluorescent material need be adapted to the light source of the SIM or SSIM device. Preferably the layer of photoluminescent or fluorescent material is a photoluminescent or fluorescent crystal, in particular in a monocrystalline form in view of the advantageous optical properties of a monocrystal. Particularly preferred example materials for the host crystal are: $(Ba,Sr)_2SiO_4$, $Ba_2LiSi_7AlN_{12}$, $Ba_2Si_5N_8$, $BaAl_8O_{13}$, $BaAl_{12}O_{19}$, $BaF_2$, $BaMgAl_{10}O_{17}$, $BaSi_2O_5$, $BaSi_7N_{10}$, $Ca_2Si_5N_8$, $Ca_5(PO_4)_3(F,Cl)$, $CaAlSiN_3$, $(Ca,Mg)SiO_3$, $(Ca,Sr)AlSiN_3$, $(Ca,Sr)_2SiO_4$, $CaS$, $CaSc_2O_4$, $CaZnGe_2O_6$, $CdSe$, $Cd_2B_2O_5$, $CeMgAl_{11}O_{19}$, $Ga_2O_3$, $Gd_2O_2S$, $Gd_3Ga_5O_{12}$, $Gd_3Sc_2Al_3O_{12}$, $GdAlO_3$, $GdMgB_5O_{10}$, $K_2SiF_6$, $KY_3F_{10}$, $La_3Si_6N_{11}$, $LaB_3O_6$, $LaBO_3$, $LaMgAl_{11}O_{19}$, $LaPO_4$, $LiAlO_2$, $LiEuMo_2O_8$, $LiYF_4$, $Lu_3Al_5O_{12}$, $MgS$, $MgWO_4$, $NaYF_4$, $Sr_2Al_6O_{11}$, $Sr_2MgSi_2O_7$, $Sr_2P_2O_7$, $Sr_2Si_5N_8$, $Sr_3Gd_2Si_6O_{18}$, $Sr_4Al_{14}O_{25}$, $Sr_5(PO_4)_3Cl$, $SrAl_{12}O_{19}$, $SrB_4O_7$, $SrGa_2O_4$, $SrLiAl_3N_4$, $SrMgSi_3N_4$, $SrS$, $Tb_3Al_5O_{12}$, $Y_2O_3$, $(Y,Gd)_2O_3$, $Y_2O_2S$, $Y_3Al_5O_{12}$, $(Y,Gd)_3Al_5O_{12}$, $Y_3(Al,Ga)_5O_{12}$, $(Y,Gd)BO_3$, $YAlO_3$, $YPO_4$, $YVO_4$, $Zn_2SiO_4$, $(Zn,Be)_2SiO_4$, $Zn_2(Si,Ge)O_4$, $ZnGa_2O_4$, $ZnS$. Particularly preferred example elements for the dopant are rare earth metals such as Bi, Ce, Er, Eu, Dy, Gd, Ho, La, Lu, Sc, Nd, Pr, Tb, Tm, and Yb, and metals such as Co, Mn, Fe, Pb, Cu, Al, Au, Cr, and Ti. Ce, Eu, Cr, and Ti are particularly preferred elements. Particularly preferred fluorescent materials are: $Y_3Al_5O_{12}:Ce^{3+}$, $Lu_2SiO_5:Ce^{3+}$, $Al_2O_3:Cr^{3+}$, and $Al_2O_3:Ti^{3+}$.

The latter materials are, inter alia preferred because their optical properties perfectly fit to the emitted wavelength of certain standard laser light sources such as Yb:YAG, Nd:YAG or Ti:Sa.

In order to improve the signal-to-noise ratio of the inventive method it is preferred that a light reflecting layer is present between the sample support and the layer of photoluminescent material. Preferably, the photoluminescent or fluorescent material exhibits an excitation maximum at a first wavelength and an emission maximum at a second wavelength, wherein the light reflecting layer has a reflectance at 90° of at least 80%, preferably at least 90% and more preferably at least 95% for light having the first wavelength and/or for light having the second wavelength.

Again, a standard SIM or SSIM device may be upgraded with both the photoluminescent or fluorescent material and the light reflecting layer, wherein either separate layers may be arranged on or mounted to the standard sample support of said standard SSIM device or a laminate of both the photoluminescent or fluorescent material and the light reflecting layer may be placed on the sample support before placing the data carrier on said upgraded sample support.

According to the first aspect, the present invention further relates to a system for reading out information from a data carrier using the method as described above. The system comprises an SIM or SSIM device having a sample support comprising a layer of a photoluminescent or fluorescent material, and a processor adapted for processing the SIM or SSIM images in order to decode the information encoded on the data carrier. As outlined above with regard to the method, the sample support may further comprise a light reflecting layer on top of the layer of photoluminescent or fluorescent material.

As outlined above, the first aspect of the present invention utilizes a transparent ceramic material, which may have a glassy or crystalline state. Particularly preferred transparent ceramic materials are: sapphire ($Al_2O_3$), silica ($SiO_2$), zirconium ($Zr(SiO_4)$), $ZrO_2$, or transparent ceramic materials comprising one or a combination of the following materials: silicon oxide, aluminum oxide, boron oxide, sodium oxide, potassium oxide, lithium oxide, zinc oxide, magnesium oxide.

In general, any material having the above-mentioned optical properties may be used for the coating layer. However, in light of the envisaged long-term stability of the data carrier, it is particularly preferred that the coating layer comprises one or a combination of the following materials: Cr, Co, Ni, Fe, Al, Ti, Si, W, Zr, Ta, Th, Nb, Mn, Mg, Hf, Mo, V; a metal nitride such as CrN, CrAlN, TiN, TiCN, TiAlN, ZrN, AlN, VN, $Si_3N_4$, ThN, HfN, BN; a metal carbide such as TiC, CrC, $Al_4C_3$, VC, ZrC, HfC, ThC, $B_4C$, SiC; a metal oxide such as $Al_2O_3$, $TiO_2$, $SiO_2$, $ZrO_2$, $ThO_2$, MgO, $Cr_2O_3$, $Zr_2O_3$, $V_2O_3$; a metal boride such as $TiB_2$, $ZrB_2$, $CrB_2$, $VB_2$, $SiB_6$, $ThB_2$, $HfB_2$, $WB_2$, $WB_4$; or a metal silicide such as $TiSi_2$, $ZrSi_2$, $MoSi_2$, MoSi, $WSi_2$, PtSi, $Mg_2Si$.

As discussed above, the invention according to the first aspect employs the photoluminescent or fluorescent material only during decoding the encoded information. Alternatively, one may of course also incorporate the photoluminescent or fluorescent material into the data carrier itself.

Accordingly, the present invention according to a second aspect refers to a data carrier comprising a ceramic substrate having first and second opposite sides, and a first layer of a photoluminescent or fluorescent material provided on the first side of the ceramic substrate, wherein the first layer of the photoluminescent or fluorescent material comprises a plurality of recesses encoding information. As outlined above, these recesses may encode any information in any analog and/or digital format.

Different from the invention according to the first aspect, the ceramic substrate of this second aspect does not need to be transparent. Thus, various materials are suitable for the ceramic substrate, for example those enumerated in the above-incorporated WO 2021/028035 Publication. It is particularly preferred that the ceramic substrate comprises an oxidic ceramic. Preferably, the ceramic substrate comprises at least 90%, more preferably at least 95%, by weight of one or a combination of $Al_2O_3$, $TiO_2$, $SiO_2$, $ZrO_2$, $ThO_2$, MgO, $Cr_2O_3$, $Zr_2O_3$, $V_2O_3$ or any other oxidic ceramic material. It is further preferred that the ceramic substrate comprises a non-oxidic ceramic. Preferably, the ceramic substrate comprises at least 90%, more preferably at least 95%, by weight of one or a combination of a metal nitride such as CrN, CrAlN, TiN, TiCN, TiAlN, ZrN, AlN, VN, $Si_3N_4$, ThN, HfN, BN; a metal carbide such as TiC, CrC, $Al_4C_3$, VC, ZrC, HfC, ThC, $B_4C$, SiC; a metal boride such as $TiB_2$, $ZrB_2$, $CrB_2$, $VB_2$, $SiB_6$, $ThB_2$, $HfB_2$, $WB_2$, $WB_4$; and a metal silicide such as $TiSi_2$, $ZrSi_2$, $MoSi_2$, $WSi_2$, PtSi, $Mg_2Si$ or any other non-oxidic ceramic material.

The photoluminescent or fluorescent material may be any photoluminescent or fluorescent material. In the context of the present invention, any material having a photoluminescence quantum yield or fluorescence quantum yield of at least 10% is considered a "photoluminescent material" or "fluorescent material". Photoluminescence quantum yield of a photoluminescent material is defined as the number of photons emitted as a fraction of the number of photons absorbed. The fluorescence quantum yield of a fluorescent material is the ratio of the number of photons emitted to the number of absorbed photons. While the layer of photoluminescent or fluorescent material need not consist entirely of said material but may also contain additives for various reasons, it is preferred that the entire layer of photoluminescent or fluorescent material exhibits a quantum yield of at least 10%, preferably of at least 20% and more preferably of at least 30%.

Preferably, the photoluminescent or fluorescent material is a photoluminescent or fluorescent crystal, in particular in a monocrystalline form in view of the advantageous optical properties of a monocrystal. Particularly preferred example materials for the host crystal are: $(Ba,Sr)_2SiO_4$, $Ba_2LiSi_7AlN_{12}$, $Ba_2Si_5N_8$, $BaAl_8O_{13}$, $BaAl_{12}O_{19}$, $BaF_2$, $BaMgAl_{10}O_{17}$, $BaSi_2O_5$, $BaSi_7N_{10}$, $Ca_2Si_5N_8$, $Ca_5(PO_4)_3(F, Cl)$, $CaAlSiN_3$, $(Ca,Mg)SiO_3$, $(Ca,Sr)AlSiN_3$, $(Ca,Sr)_2SiO_4$, CaS, $CaSc_2O_4$, $CaZnGe_2O_6$, CdSe, $Cd_2B_2O_5$, $CeMgAl_{11}O_{19}$, $Ga_2O_3$, $Gd_2O_2S$, $Gd_3Ga_5O_{12}$, $Gd_3Sc_2Al_3O_{12}$, $GdAlO_3$, $GdMgB_5O_{10}$, $K_2SiF_6$, $KY_3F_{10}$, $La_3Si_6N_{11}$, $LaB_3O_6$, $LaBO_3$, $LaMgAl_{11}O_{19}$, $LaPO_4$, $LiAlO_2$, $LiEuMo_2O_8$, $LiYF_4$, $Lu_3Al_5O_{12}$, MgS, $MgWO_4$, $NaYF_4$, $Sr_2Al_6O_{11}$, $Sr_2MgSi_2O_7$, $Sr_2P_2O_7$, $Sr_2Si_5N_8$, $Sr_3Gd_2Si_6O_{18}$, $Sr_4Al_{14}O_{25}$, $Sr_5(PO_4)_3Cl$, $SrAl_{12}O_{19}$, $SrB_4O_7$, $SrGa_2O_4$, $SrLiAl_3N_4$, $SrMgSi_3N_4$, SrS, $Tb_3Al_5O_{12}$, $Y_2O_3$, $(Y,Gd)_2O_3$, $Y_2O_2S$, $Y_3Al_5O_{12}$, $(Y,Gd)_3Al_5O_{12}$, $Y_3(Al,Ga)_5O_{12}$, $(Y,Gd)BO_3$, $YAlO_3$, $YPO_4$, $YVO_4$, $Zn_2SiO_4$, $(Zn,Be)_2SiO_4$, $Zn_2(Si,Ge)O_4$, $ZnGa_2O_4$, ZnS. Particularly preferred example elements for the dopant are rare earth metals such as Bi, Ce, Er, Eu, Dy, Gd, Ho, La, Lu, Sc, Nd, Pr, Tb, Tm, and Yb, and metals such as Co, Mn, Fe, Pb, Cu, Al, Au, Cr, and Ti. Ce, Eu, Cr, and Ti are particularly preferred elements. Particularly preferred fluorescent materials are: $Y_3Al_5O_{12}:Ce^{3+}$, $Lu_2SiO_5:Ce^{3+}$, $Al_2O_3:Cr^{3+}$, and $Al_2O_3:Ti^{3+}$.

The latter materials are, inter alia preferred because their optical properties perfectly fit to the emitted wavelength of certain standard laser light sources such as Yb:YAG, Nd:YAG or Ti:Sa.

The method of reading out information from said data carrier, which will be discussed in more detail further below, will, in essence, work analogously to the one discussed above with the photoluminescent or fluorescent contrast being achieved by said photoluminescent or fluorescent material being either present (where the first layer is intact) or not present (where a recess is provided). Since a small amount of photoluminescent or fluorescent material remaining at the bottom of such a recess may lead to strong noise, it is preferred that the photoluminescent or fluorescent material is completely eliminated over substantially the entire cross-section of the recess and all the way down to the bottom of the first layer. Accordingly, it is preferred that each recess in the first layer has a depth which is substantially equal to or even greater than the thickness of the first layer. At the same time, it is preferred that each recess extends into the substrate with a depth of at most 1 μm, preferably at most 100 nm and more preferably at most 50 nm in order to avoid any negative impacts on the ceramic substrate due to the presence of these recesses. As outlined above with respect to the first aspect, it is preferred that each recess extends into the substrate by less than 1%, preferably less than 0.1% and even more preferably less than 0.01% of the thickness of the substrate.

In order to enhance the data storage capacity of the data carrier, the data carrier preferably further comprises a second layer of a photoluminescent or fluorescent material provided on the second side of the ceramic substrate, wherein the second layer of the photoluminescent or fluorescent material comprises a plurality of recesses encoding information.

A first light reflecting layer may be present between the ceramic substrate and the first layer of photoluminescent or fluorescent material and/or a second light reflecting layer may be present between the ceramic substrate and the second layer of photoluminescent or fluorescent material. The light reflecting property should be present at the excitation and emission wavelength of the photoluminescent or fluorescent material. Accordingly, the photoluminescent or fluorescent material exhibits an excitation maximum at a first wavelength and an emission maximum at a second wavelength, wherein the first and/or second light reflecting layer(s) preferably has/have a reflectance at 90° of at least 80%, preferably at least 90% and more preferably at least 95% for light having the first wavelength and/or for light having the second wavelength.

Said first and second light reflecting layers may comprise metals with high reflectivity like Cu, Al, Au, Ag, Ni, Cr, Pt and Ti.

In the data carrier according to the second aspect of the present invention as discussed above, the optical contrast is achieved by photoluminescent or fluorescent material being present (no recess) or not being present (recess). In the method according to the first aspect of the present invention, the optical contrast is achieved by partially covering (no recess) or exposing (recess) the photoluminescent or fluorescent material of the sample support. This latter concept may also be employed in the data carrier itself. Consequently, the present invention, according to a third aspect, also relates to a data carrier comprising a ceramic substrate having first and second opposite sides, a first layer of a photoluminescent or fluorescent material provided on the first side of the ceramic substrate, and a first coating layer provided on the first layer of the photoluminescent or fluorescent material, wherein the material of the first coating layer is different from the photoluminescent or fluorescent material, and wherein the first coating layer comprises a plurality of recesses encoding information.

Again, the recess may encode any information in any analog and/or digital format. Similar to the second aspect, the ceramic substrate of the third aspect need not be transparent and can comprise any of the materials discussed above. Similarly, the photoluminescent or fluorescent material employed in this third aspect may be the material discussed above with regard to the second aspect.

Similar to the first aspect, the first coating of the data carrier of the third aspect shields the underlying photoluminescent or fluorescent material from light exposure and, accordingly, an optical contrast may be achieved by the first coating layer being present (no recess) or not present (recess) thus covering or exposing the photoluminescent material. It is, accordingly, preferred that the first coating layer is light absorbing and/or light reflecting at the excitation and/or emission wavelength of the photoluminescent material. The first coating layer preferably absorbs and/or reflects at least 10%, preferably at least 30%, more preferably at least 50%, even more preferably at least 70% and most preferably at least 90% of the incident electromagnetic power at the excitation and the emission wavelengths.

As mentioned above, different techniques may be employed in order to measure and/or calculate the absorption and reflection properties of the layers of the data carrier. For example, the transmission, absorption and reflection at a certain wavelength may be measured separately for the entire data carrier, for the substrate only and for the substrate coated only with the layer of photoluminescent or fluorescent material, which will allow to calculate the corresponding optical properties of the coating layer.

Apart from this requirement, the materials outlined above for the coating layer of the first aspect may also be employed for the first coating layer of this third aspect.

Similar to the second aspect, both sides of the data carrier may be employed for encoding data. Accordingly, the data carrier may further comprise a second layer of a photoluminescent or fluorescent material provided on the second side of the ceramic substrate, and a second coating layer provided on the second layer of the photoluminescent or fluorescent material, wherein the material of the second coating layer is different from the photoluminescent or fluorescent material, and wherein the second coating layer comprises a plurality of recesses encoding information.

Preferably, the photoluminescent or fluorescent material exhibits an excitation maximum at a first wavelength and an emission maximum at a second wavelength, wherein the first and/or second coating layers are substantially intransparent for light having the first wavelength and/or for light having the second wavelength. The excitation and the emission wavelengths may range from UV (100 nm-400 nm) to visible light (400 nm-780 nm) to near-infra-red spectrum (780 nm-5000 nm).

Preferably, each recess in the first and/or second coating layer has a depth which is substantially equal to the thickness of the respective coating layer in order to ensure that, during decoding, light may reach the photoluminescent or fluorescent material covered by the first and/or second coating layer. As discussed above, a perfect adjustment of the depth of each recess may be cumbersome. It is thus preferred that each recess in the first and/or second coating layer has a depth which is greater than the thickness of the respective coating layer so as to slightly extend into the first and/or second layer of photoluminescent or fluorescent material. However, in order to advantageously benefit from the entire thickness of the photoluminescent or fluorescent material layer in order to optimize the contrast during decoding, it is preferred that each recess extends into the first and/or the second layer of photoluminescent or fluorescent material by a depth corresponding to at most 10%, preferably at most 1% and even more preferably at most 0.1% of the thickness of the layer of photoluminescent or fluorescent material.

As mentioned above, the first and/or second coating layer should be sufficiently thick in order to be intransparent to the excitation and emission wavelength of the photoluminescent or fluorescent material. However, apart from this requirement, it is preferred to minimize the thickness of the first and/or second coating layer. Consequently, the thickness of the first and/or second coating layer is preferably at most 1 μm, more preferably at most 100 nm, even more preferably at most 30 nm and most preferably at most 10 nm.

As discussed above with regard to the first aspect, the signal-to-noise ratio may be increased by providing a light reflecting layer. Accordingly, the data carrier of this third aspect preferably comprises a first light reflecting layer between the ceramic substrate and the first layer of photoluminescent or fluorescent material and/or a second light reflecting layer between the ceramic substrate and the second layer of photoluminescent or fluorescent material. The photoluminescent or fluorescent material exhibits an excitation maximum at a first wavelength and an emission maximum at a second wavelength and the first and/or the second light reflecting layer(s) preferably has/have a reflectance at 90° of at least 80%, preferably at least 90% and more preferably at least 95% for light having the first wavelength and/or for light having the second wavelength.

The thickness of the first and/or second layers of photoluminescent or fluorescent material should be sufficiently large to provide a sufficient optical response during decoding. Otherwise, it is also preferred to minimize the thickness of these layers. Accordingly, the thickness of the first and/or the second layer of photoluminescent or fluorescent material is preferably at most 1 µm, more preferably at most 100 nm and most preferably at most 10 nm.

In light of the envisaged long-term stability of the data carriers of the present invention, it is preferred that a sintered interface is present between the first and/or second coating layer and the first and/or second layer of photoluminescent or fluorescent material, respectively, wherein the sintered interface preferably comprises at least one element from the respective coating layer and at least one element from the respective layer of photoluminescent material. It is similarly preferred that a sintered interface is present between the ceramic substrate and the first and/or second layer of photoluminescent or fluorescent material, wherein the sintered interface preferably comprises at least one element from the ceramic substrate and at least one element from the respective layer. The benefits of tempering and the presence of a sintered interface have been elucidated in detail in the above-incorporated WO 2021/028035 Publication, in particular with regard to these aspects.

Particularly preferred materials for the first and/or second layer of photoluminescent or fluorescent material of this third aspects are the ones discussed above with regard to the second aspect.

Various materials are suitable for the ceramic substrate, for example those enumerated in the above-incorporated WO 2021/028035 Publication. It is particularly preferred that the ceramic substrate comprises an oxidic ceramic. Preferably, the ceramic substrate comprises at least 90%, more preferably at least 95%, by weight of one or a combination of $Al_2O_3$, $TiO_2$, $SiO_2$, $ZrO_2$, $ThO_2$, MgO, $Cr_2O_3$, $Zr_2O_3$, $V_2O_3$ or any other oxidic ceramic material. It is further preferred that the ceramic substrate comprises a non-oxidic ceramic. Preferably, the ceramic substrate comprises at least 90%, more preferably at least 95%, by weight of one or a combination of a metal nitride such as CrN, CrAlN, TiN, TiCN, TiAlN, ZrN, AlN, VN, $Si_3N_4$, ThN, HfN, BN; a metal carbide such as TiC, CrC, $Al_4C_3$, VC, ZrC, HfC, ThC, $B_4C$, SiC; a metal boride such as $TiB_2$, $ZrB_2$, $CrB_2$, $VB_2$, $SiB_6$, $ThB_2$, $HfB_2$, $WB_2$, $WB_4$; and a metal silicide such as $TiSi_2$, $ZrSi_2$, $MoSi_2$, $WSi_2$, PtSi, $Mg_2Si$ or any other non-oxidic ceramic material.

However, in order to achieve ultra-thin data carriers, as outlined in detail in European (EP) Published Patent Application 4044182 A1, which is hereby incorporated by reference in its entirety, it is particularly preferred that the ceramic substrate comprises one or a combination of the following materials: silicone oxide, aluminum oxide, boron oxide, sodium oxide, potassium oxide, lithium oxide, zinc oxide, magnesium oxide.

Preferably, the ceramic substrate has a thickness of at most 2 mm, more preferably at most 1 mm, more preferably at most 200 µm, more preferably at most 100 µm, even more preferably of at most 50 µm.

As discussed in EP 4044182 A1, the ceramic substrate preferably has a Young's modulus of at most 80 GPa, preferably of at most 75 GPa. It is further preferred, that the data carrier does not break at a radius of curvature of 250 mm, preferably 200 mm and more preferably 150 mm, even more preferably 100 mm and most preferably 50 mm. Such materials allow for the data carrier to be wound up in a roll.

The present invention further relates to a method of manufacturing a data carrier according to the second aspect. The method comprises providing a ceramic substrate, coating the ceramic substrate with a first layer of a photoluminescent or fluorescent material provided on the first side of the ceramic substrate, and generating a plurality of recesses in the first layer of photoluminescent or fluorescent material by means of, e.g., laser ablation. Optionally, the ceramic substrate may be coated with a second layer of a photoluminescent or fluorescent material provided on the second side of the ceramic substrate. In this case, a plurality of recesses will be generated in the second layer of the photoluminescent or fluorescent material by means of, e.g., laser ablation.

The present invention further relates to a method of manufacturing a data carrier according to the second aspect. The method comprises providing a ceramic substrate, coating the ceramic substrate with a first layer of a photoluminescent or fluorescent material provided on the first side of the ceramic substrate, and generating a plurality of recesses in the first layer of photoluminescent or fluorescent material by means of, e.g., laser ablation. Optionally, the ceramic substrate may be coated with a second layer of a photoluminescent or fluorescent material provided on the second side of the ceramic substrate. In this case, a plurality of recesses will be generated in the second layer of the photoluminescent or fluorescent material by means of, e.g., laser ablation.

Coating the various layers may be performed by any known film coating method, preferably by physical vapor deposition or chemical vapor deposition.

As discussed above, it is particularly preferred to connect the various layers to each other by means of sintering interfaces. These may be achieved by tempering the coated substrate at a temperature of at least 200° C., preferably at least 500° C., more preferably at least 1,000° C.

As discussed above, the step of encoding information in the data carrier, i.e., of generating a plurality of recesses in the layer of photoluminescent or fluorescent material or in one of the coating layers, is performed by means of, e.g., laser ablation. One exemplary method of laser ablation and a device for performing such method is disclosed in detail in (EP) Published Patent Application 3955248 A1, which is hereby incorporated by reference in its entirety. It would generally be preferable to be able to utilize one and the same device for reading and writing, i.e., for encoding the data by means of laser ablation and for decoding the data using SIM or SSIM. This is generally possible if laser ablation is performed at the excitation maximum of the photoluminescent or fluorescent material (of course, ablation will be performed with a power density several orders of magnitude greater than that used during decoding). Accordingly, it is preferred that the photoluminescent or fluorescent material exhibits an excitation maximum at a first wavelength and an emission maximum at a second wavelength and that laser ablation is performed at, or close to, the first wavelength. Preferably, the wavelength shift between the laser ablation wavelength and the first wavelength is smaller than 30 nm, preferably smaller than 20 nm, and more preferably smaller than 10 nm.

While the present invention first and foremost discusses ablation using a laser beam, the present invention does also envisage the use of, e.g., a particle beam to ablate material and to create the recesses. This is particularly preferably for recesses having a size substantially smaller than the diffraction limit (for example, for circular recesses having a diameter of smaller than 50 nm), which may be easily discerned utilizing SSIM, but which may be difficult to reproducibly create by means of a laser.

The present invention further relates to a method of reading out information from a data carrier according to the second or third aspect. The method comprises providing an SIM or SSIM device having a sample support, placing a data carrier according to the second or third aspect as discussed above on the sample support, acquiring SIM or SSIM images from the layer of photoluminescent material of the data carrier, and processing the SIM or SSIM images in order to decode the information encoded on the data carrier.

As outlined above, utilizing SIM and in particular SSIM, structures far smaller than the diffraction limit may be imaged. Accordingly, the maximum dimension of the cross-section of each recess perpendicular to its depth is preferably smaller than 250 nm, more preferably smaller than 100 nm, more preferably smaller than 50 nm, even more preferably smaller than 30 nm and most preferably smaller than 20 nm.

BRIEF DESCRIPTION OF THE DRAWINGS

Preferred embodiments of the present invention will be further elucidated below with reference to the Figures.

DETAILED DESCRIPTION

Figure 1:
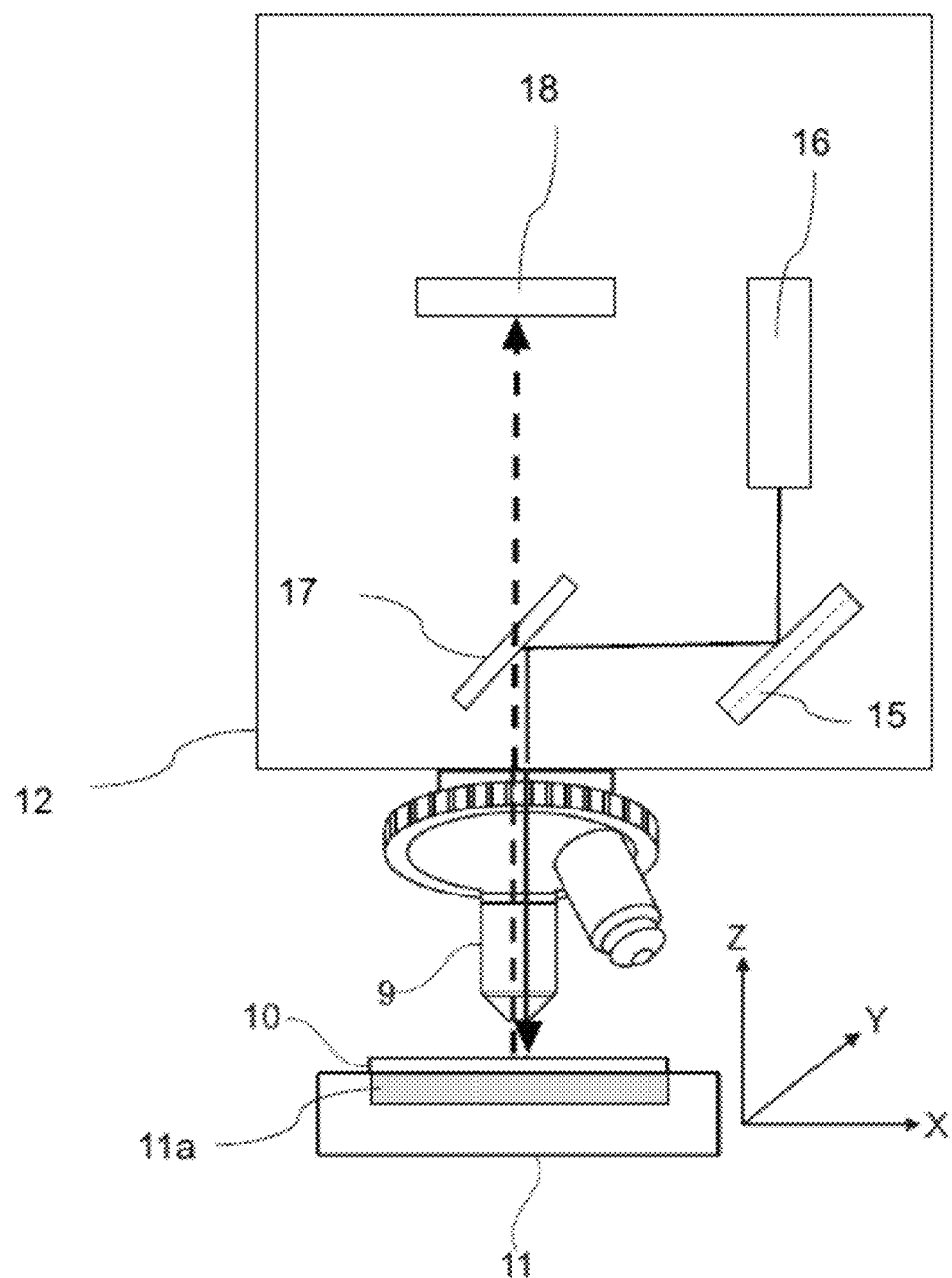
FIG. 1 shows a schematic view of a system for reading out information according to a preferred embodiment.

FIG. 1 displays a schematic view of a system for reading out information according to a preferred embodiment. The system comprises an SIM or SSIM device having a sample support 11 comprising a layer of a photoluminescent or fluorescent material 11a. The SIM or SSIM device comprises a reading device 12 configured to image the recorded data through focusing optics 9. The reading device 12 in this embodiment comprises a digital micromirror device (DMD) 15 for illuminating in reading mode. A high-resolution digital camera 18 is utilized for imaging. The beam splitter 17 is positioned between the DMD 15 and the focusing optics 9 in order to allow for light emitted from the data carrier 10 to pass to the high-resolution digital camera 18.

Illumination of the area to be imaged by the reading device 12 may be achieved by a light source 16 (e.g. LED or laser source) for data recording or another laser source using the DMD 5 (see FIG. 3 and FIG. 4) of the recording path. The SIM or SSIM device further comprises a processor (not shown) for processing the SIM or SSIM images in order to decode the information encoded on the data carrier.

Figure 2A:
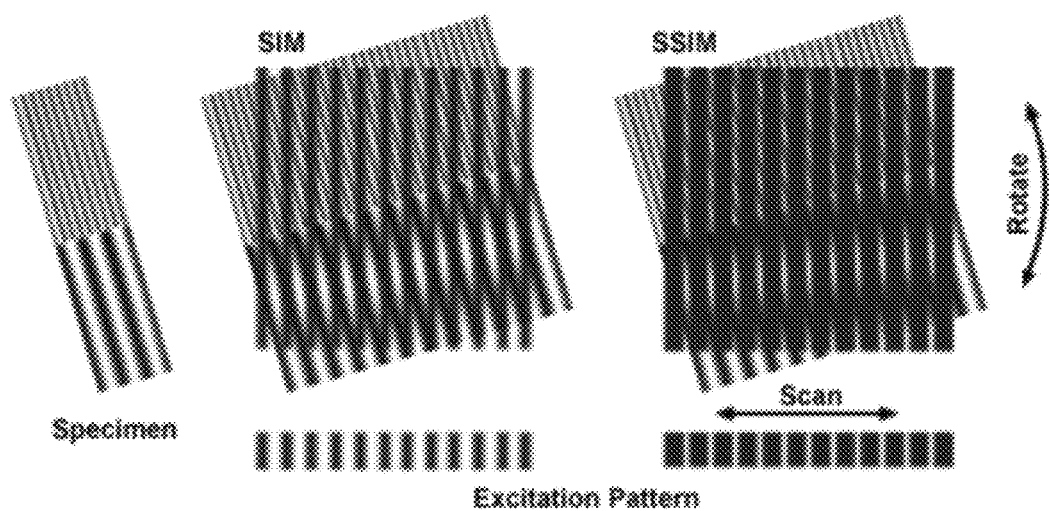
FIGS. 2a-2b show a schematic explanation of illumination and excitation schemes for structured illumination (SIM) and saturated structured illumination (SSIM)
Figure 2B:
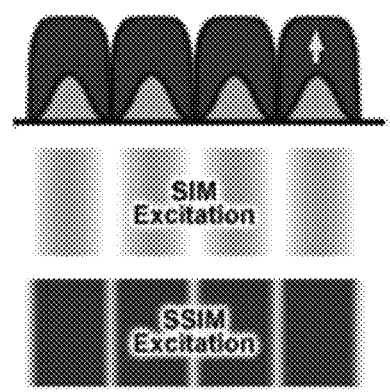

As mentioned above and explained in detail in the publication by Gustafsson, the SIM or SSIM technique requires structured illumination. Thus, in order to optically resolve the sub-resolution structure on the data carrier 10, the data carrier 10 is illuminated with a predetermined light pattern, for example with a pattern of stripes as schematically shown in FIG. 2b, which displays an exemplary linear excitation pattern used in structured illumination (SIM) and an exemplary non-linear saturated excitation pattern used in saturated structured illumination (SSIM) (taken from http://zeiss-campus.magnet.fsu.edu/articles/superresolution/supersim.html). For the subsequent decomposition of the acquired images several images have to be taken with the illumination pattern being rotated (see FIG. 2a). These illumination patterns at different rotations are generated by the DMD 15 which is accordingly controlled by the processor of the SIM or SSIM device. The resulting SIM or SSIM images taken by the high-resolution digital camera 18 are then processes by the processor in order to generate a high-resolution image of the data carrier 10 and to decode the information encoded on the data carrier.

Figure 3:
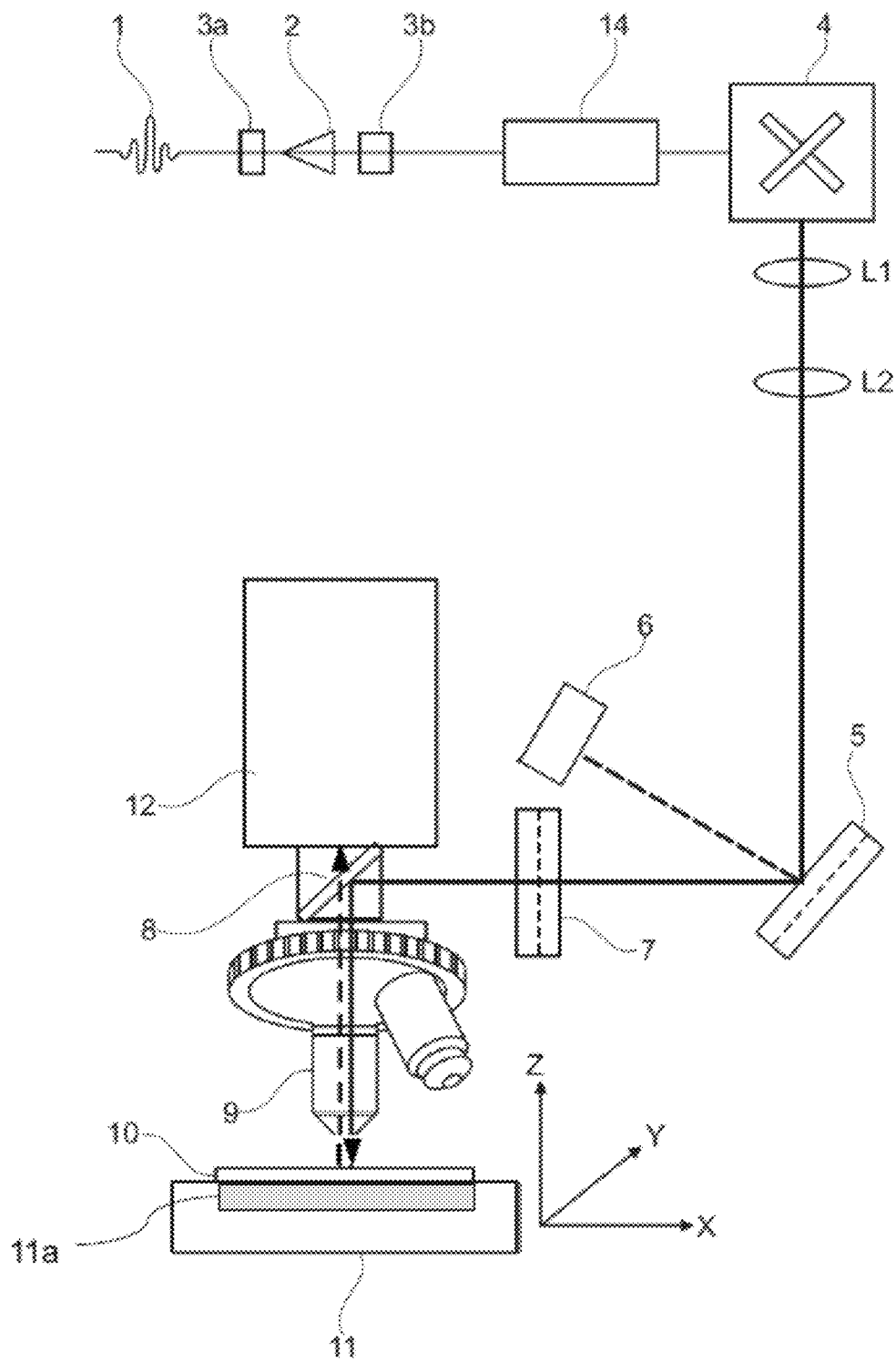
FIG. 3 shows a schematic view of a device for high-speed recording data and reading out information according to another preferred embodiment.

FIG. 3 shows a schematic illustration of a device adapted for both high-speed recording data and reading out information according to a preferred embodiment of the present invention. FIG. 3 is almost identical to FIG. 1 of Int'l (PCT) Published Patent Application WO 2022/033701, which is herewith incorporated by reference in its entirety, showing a device for high-speed recording data.

The device comprises a laser source 1, a motorized attenuator 3a, a beam expander 2, an attenuation rotator 3b, a flat top beam shaper (preferably including collimating optics) 14, a galvanometer scanner 4, a digital micromirror device 5 adapted to emit multiple laser beams (of which only a single one is shown for simplicity), a substrate holder or sample support 11 for mounting a substrate or data carrier 10, and focusing optics 9 adapted for focusing each of the multiple laser beams emitted by the DMD 5 onto the substrate 10 mounted on the substrate holder or sample support 11 preferably comprising a layer of photoluminescent or fluorescent material 11a The galvanometer scanner 4 is configured to temporally distribute the laser power of the laser source 1 over the DMD 5. As explained in detail in the above-incorporated WO 2022/033701 Publication, the galvanometer device 4 is configured to simultaneously illuminate only a section of the micromirror array of the DMD 5. Since the angle of the laser beam emitted from the galvanometer scanner 4 depends on the position or area on the DMD 5 which the galvanometer scanner 4 aims at, the device preferably comprises collimating optics L1, L2 in order to align the laser light emitted by the galvanometer scanner 4 to a predetermined entrance angle with respect to the DMD 5. In order to properly illuminate the galvanometer scanner 4 by means of the laser source 1 a motorized attenuator 3a, a beam expander 2, an attenuation rotator 3*b*, and a flat top beam shaper (preferably including collimating optics) 14 may be provided.

The DMD 5 comprises multiple micromirrors arranged in an array (not shown) and is adapted to emit multiple laser beams (not shown) along either a first direction (i.e., for recording) or along a second direction for each micromirror being in an "off" state diverting those laser beams into a beam dump 6. For each micromirror being in an "on" state, a laser beam is emitted via a beam splitter 8 through a focusing optics 9 which may, for example, comprise standard microscope optics having a high numerical aperture, onto the substrate 10 (i.e. the data carrier of the present invention without the recesses being formed yet) being mounted on an XY positioning system (which may optionally also be movable along the Z direction) in order to generate a recess at a predetermined position.

The device may further comprise beam shaping optics 7 such as a matrix of laser zone plates or a spatial light modulator, which may be configured to allow for optical proximity control, to generate Bessel beams, or to create a phase-shift mask.

The device shown in FIG. 3 further comprises a reading device 12 similar to the reading device 12 shown in FIG. 1 and discussed above in detail. Together with the focusing optics 9, the sample support 11 preferably comprising a layer of photoluminescent or fluorescent material 11*a* and the reading device 12 forms an SIM or SSIM device as discussed above which allows for acquiring SIM or SSIM images of the data carrier 10 being placed on the sample support 11 and for processing said SIM or SSIM images in order to decode the information encoded on the data carrier.

However, since the recording path of the device shown in FIG. 3 already comprises a laser light source 1 and a DMD 5, these components (15, 16) present in the reading device 12 of FIG. 1 may not be necessary for the reading device 12 of FIG. 3. Rather, the laser light source 1 and the DMD 5 may also be utilized for the imaging mode.

As outlined above, the present invention may provide the photoluminescent or fluorescent material only during reading out information. For this purpose, the sample support 11 shown in FIGS. 1 and 3 preferably comprises a layer of photoluminescent or fluorescent material 11*a* which may, e.g., be incorporated into the sample support 11 as indicated in FIGS. 1 and 3. Alternatively, a standard sample support may be upgraded with an additional layer of a photoluminescent or fluorescent material arranged or mounted on top of said sample support.

Figure 5:
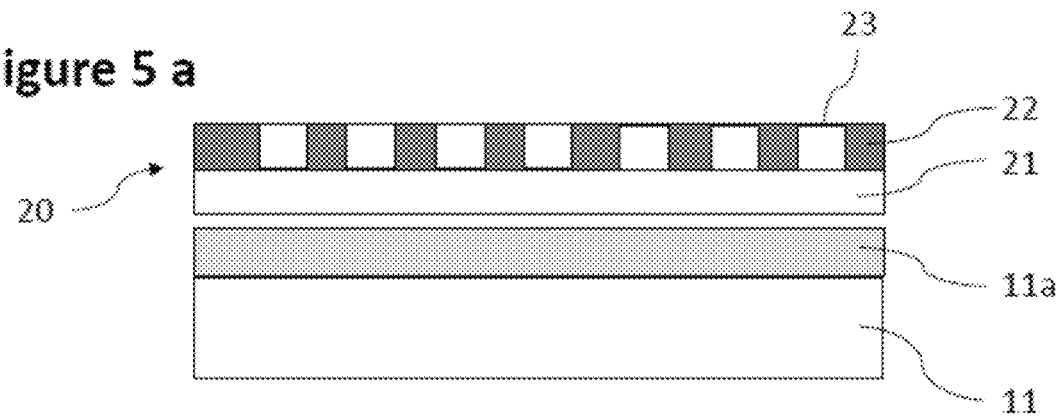
FIGS. 5a-5d show a schematic arrangement of a data carrier on the sample support in various alternative embodiments of the inventive method.
Figure 5:
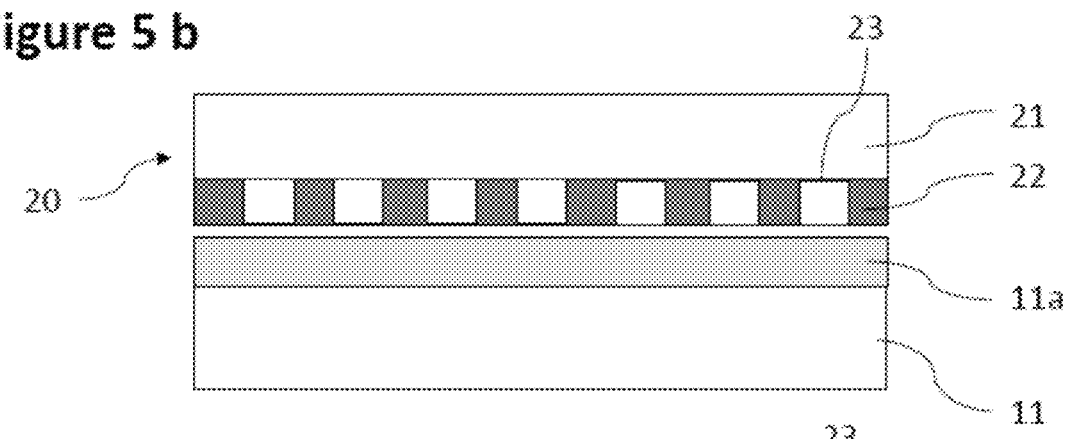
Figure 5:
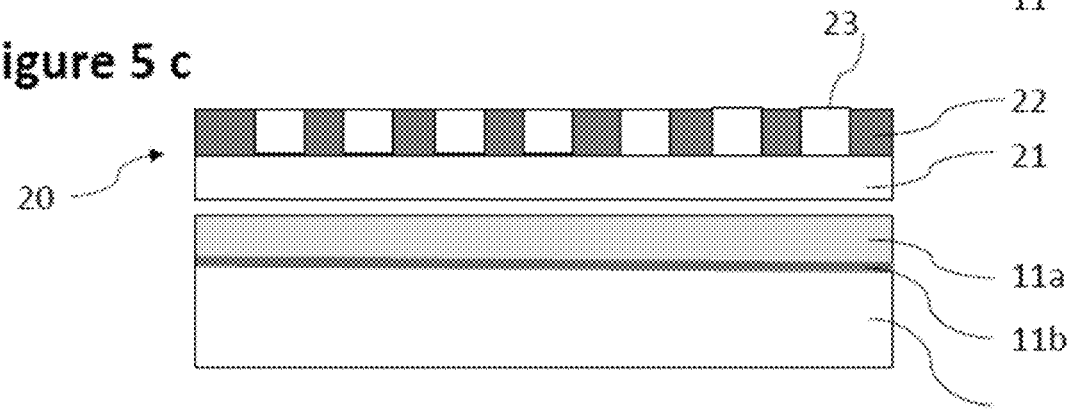
Figure 5:
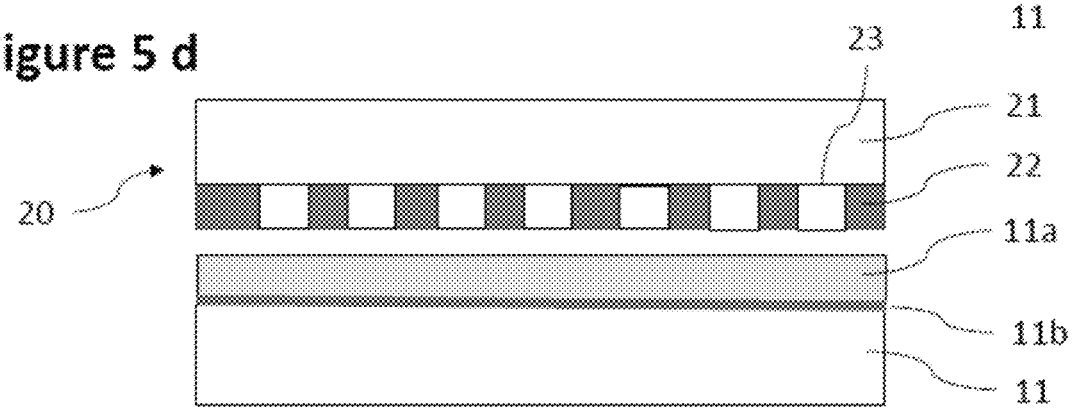

In order to read out information from a data carrier 20 comprising a transparent ceramic substrate 21 and a coating layer 22 provided on the transparent ceramic substrate 21, said coating layer comprising a plurality of recesses 23 encoding information, as shown in FIG. 5*a*, said data carrier 20 has to be placed on the layer of photoluminescent or fluorescent material 11*a* of the sample support 11 as schematically depicted in FIG. 5*a*. If the data carrier 20 is illuminated from the top (see FIG. 1) light will be absorbed or reflected by the coating layer 22 wherever no recess 23 is present. At the recesses 23, however, light will impinge directly on the transparent ceramic substrate 21, transmit said substrate 21 and lead to photoluminescence of fluorescence in the photoluminescent or fluorescent layer 11*a* in the volumes below said recesses 23 (provided that the illuminating light overlaps with the excitation wavelength range of the photoluminescent or fluorescent material). As an optical response, light of another wavelength is emitted from these volumes in the photoluminescent or fluorescent layer 11, transmitted through the transparent ceramic substrate 21 and again through the corresponding recess 23, which response may then be sensed by the reading device 12.

Acquiring, in this manner, a number of SIM or SSIM images from the layer of photoluminescent or fluorescent material 11*a* through the data carrier 20 and processing these SIM or SSIM images as described, e.g., in the publication by Gustafsson in order to reconstruct the image, an image of the pattern of recesses 23 in the coating layer 22 may be generated.

Apparently, this method of reading out information from such a data carrier will also work with the data carrier being oriented upside down as shown in FIG. 5*b*, i.e., with the data carrier 20 being placed on the layer of photoluminescent or fluorescent material 11*a* with the coating layer 22 facing the layer of photoluminescent or fluorescent material 11*a* of the sample support 11. In FIG. 5*b*, the transparent ceramic substrate 21 is depicted somewhat thicker than in FIG. 5*a* as this arrangement does not limit the thickness of the transparent ceramic substrate. In the arrangement of FIG. 5*a*, however, it is preferred to provide the transparent ceramic substrate as thin as possible in order to minimize artefacts caused by, e.g., diffraction and the like.

As discussed above, the signal-to-noise ratio of the method of the present invention may be further improved by utilizing a light reflecting layer 11*b* between the sample support 11 and the layer of photoluminescent or fluorescent material 11*a*. Such a light reflecting layer 11*b* is schematically depicted in FIGS. 5*c* and 5*d* for the arrangements shown in FIGS. 5*a* and 5*b*, respectively.

Figure 4:
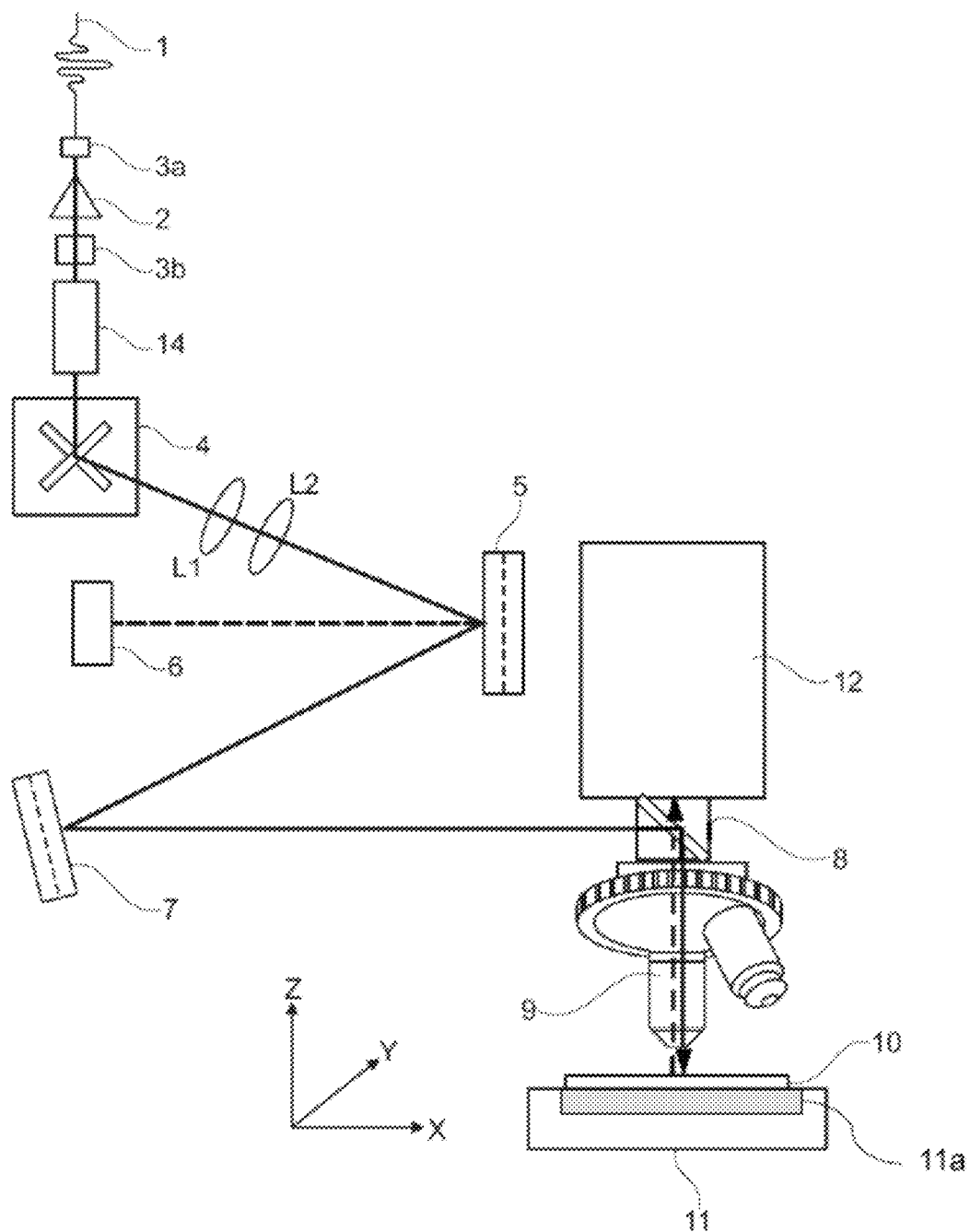
FIG. 4 shows a schematic view of a device for high-speed recording data and reading out information according to another preferred embodiment.

FIG. 3 shows an embodiment wherein the beam shaping device 7 is transmitted by the laser light. However, in case the beam shaping device comprises, e.g., a spatial light modulator in reflection mode, the optical path may be altered as shown in FIG. 4. Again, the reading device 12 may be a sensor with its own DMD (see 15 in FIG. 1) or a simpler sensor without DMD), which utilizes the DMD 5 of the recording path.

While it is apparently most preferred to utilize SSIM rather than SIM as this allows for much higher resolutions, it is to be noted that the SIM technique in combination with the use of a photoluminescent or fluorescent material does also provide certain advantages. If the wavelength with which the data carrier is being illuminated, e.g., in FIG. 3 is identical to the wavelength of the read-out beam certain artefacts such as scattered light may reduce the signal-to-noise ratio. Utilizing a photoluminescent or fluorescent material the response to be imaged by the digital camera has a wavelength different from the illumination. Thus, by employing a simple filter or a beam splitter it can be ascertained that all light entering the digital camera does originate from photoluminescent or fluorescent material under a recess and, consequently, corresponds to a true signal. Therefore, the present invention is not limited to using SSIM but also encompasses embodiments based on SIM.

As discussed above with regard to aspects 2 and 3 of the present invention, the photoluminescent or fluorescent material may alternatively be incorporated directly into the data carrier. FIGS. 6*a* to 6*d* show a schematic cross-section through various alternative embodiments of a data carrier according to the second aspect of the present invention. In its most basic form shown in FIG. 6*a*, the data carrier 30 may comprise a ceramic substrate 31 and a first layer of a photoluminescent or fluorescent material 32*a* provided on the first (here: top) side of the ceramic substrate 31, wherein the first layer of photoluminescent or fluorescent material 32*a* comprises a plurality of recesses 33 encoding information.

As shown in FIG. 6*b*, the data carrier 30 may further comprise a second layer of a photoluminescent or fluorescent material 32*b* provided on the second (here: bottom) side of the ceramic substrate 31, wherein the second layer of photoluminescent or fluorescent material 32*b* comprises a plurality of recesses 33 encoding information.

Moreover, a first light reflecting layer 34*a* may be present between the ceramic substrate 31 and the first layer of photoluminescent or fluorescent material 32*a* (see FIG. 6*c*) and a second light reflecting layer 34*b* may be present between the ceramic substrate 31 and the second layer of photoluminescent or fluorescent material 32*b* (see FIG. 6*d*).

FIGS. 7*a* to 7*d* show a schematic cross-section through various embodiments of the data carrier according to a third aspect of the present invention. Said data carrier 40 comprises a ceramic substrate 41, a first layer of a photoluminescent or fluorescent material 42*a* provided on the first (here: top) side of the ceramic substrate 41, and a first coating layer 43*a* provided on the first layer of the photoluminescent or fluorescent material 42*a*, wherein the first coating layer 43*a* comprises a plurality of recesses 44 encoding information (see FIG. 7*a*).

The data carrier 40 may further comprise a second layer of photoluminescent or fluorescent material 42*b* provided on the second (here: bottom) side of the ceramic substrate 41, and a second coating layer 43*b* provided on the second layer of the photoluminescent or fluorescent material 42*b*, wherein the second coating layer 43*b* comprises a plurality of recesses 44 encoding information (see FIG. 7*b*). Moreover, first and second light reflecting layers 45*a* and 45*b* may be present between the ceramic substrate 41 and a first and second layer of photoluminescent or fluorescent material 42*a* and 42*b*, respectively, as shown in FIGS. 7*c* and 7*d*.

Figure 6:
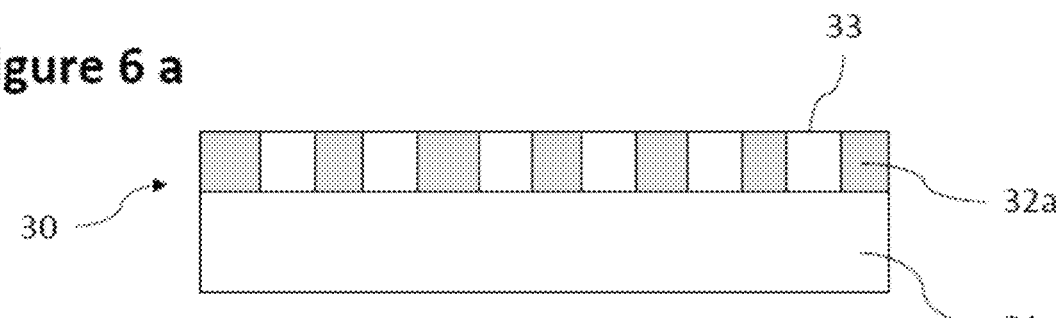
FIGS. 6a-6d show a schematic cross-section through different embodiments of a data carrier according to the present invention.
Figure 6:
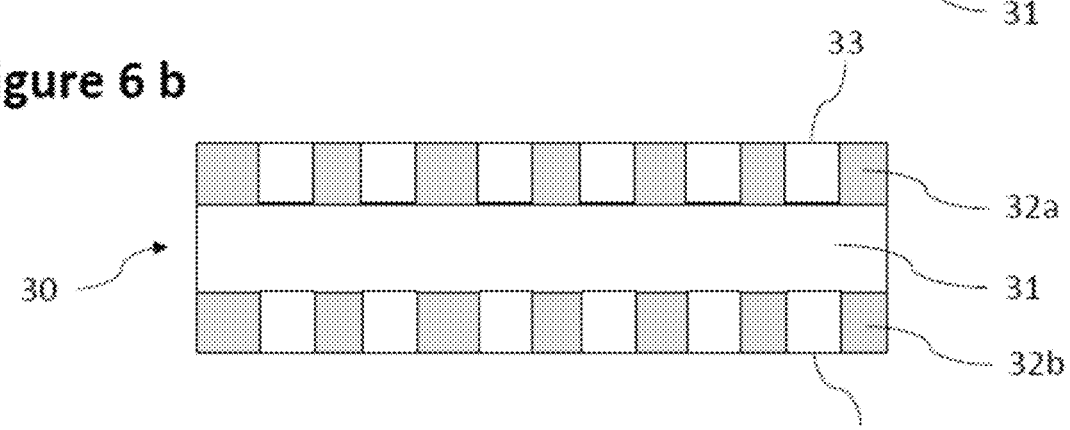
Figure 6:
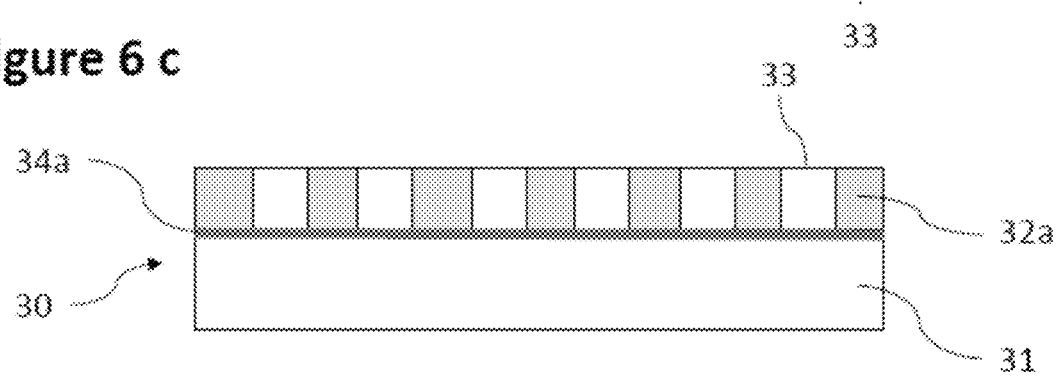
Figure 6:
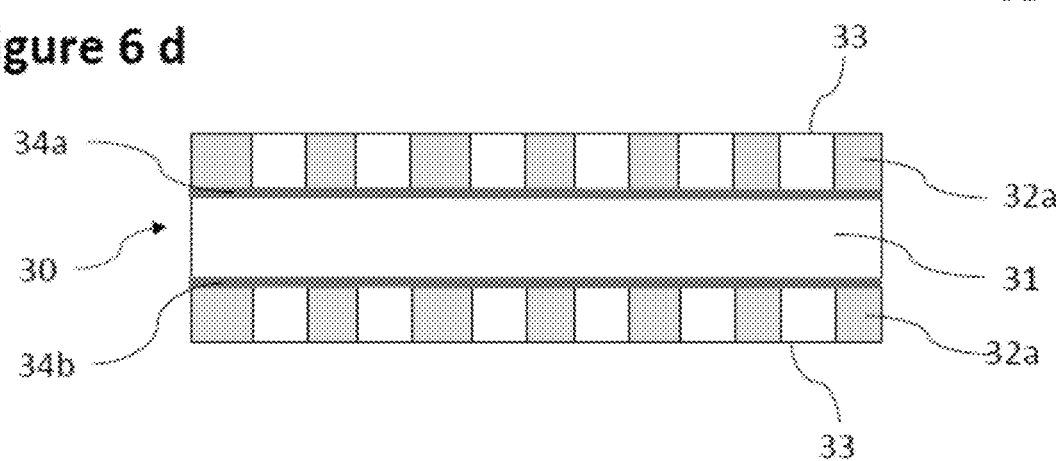
Figure 7:
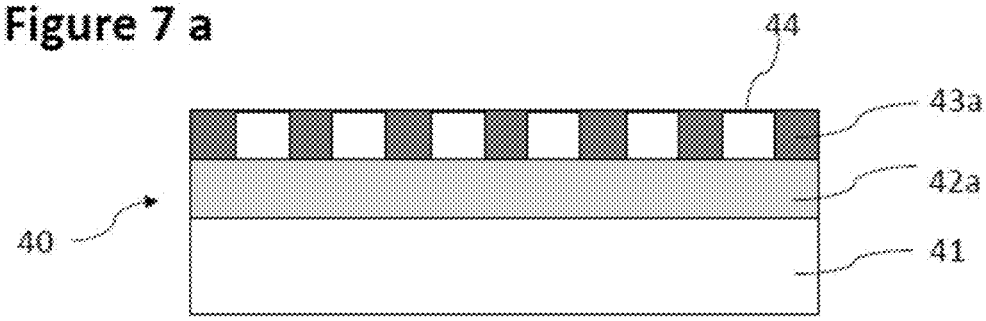
FIGS. 7a-7d show a schematic cross-section through various embodiments of the data carrier according to the present invention.
Figure 7:
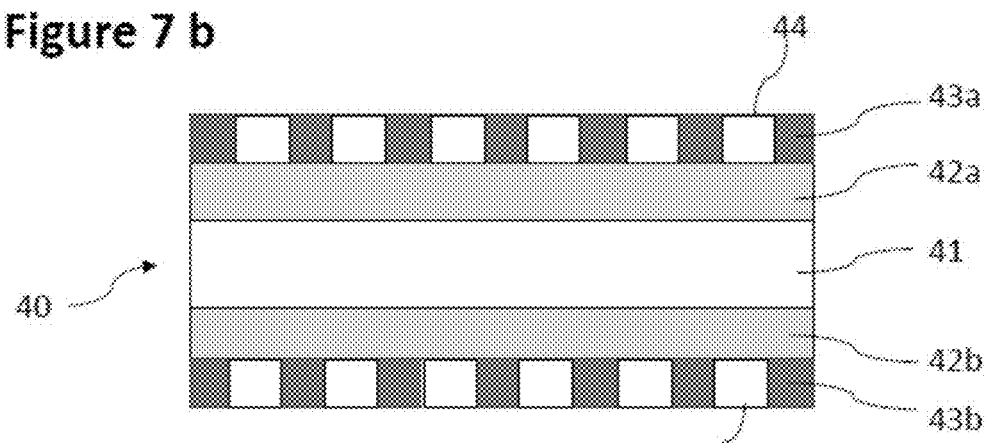
Figure 7:
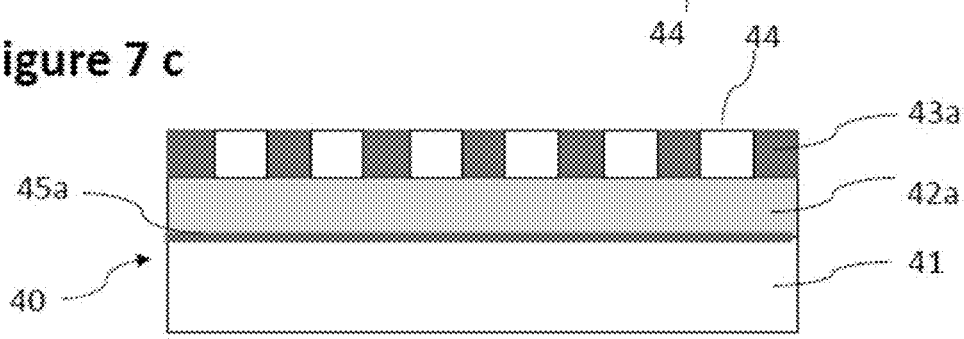
Figure 7:
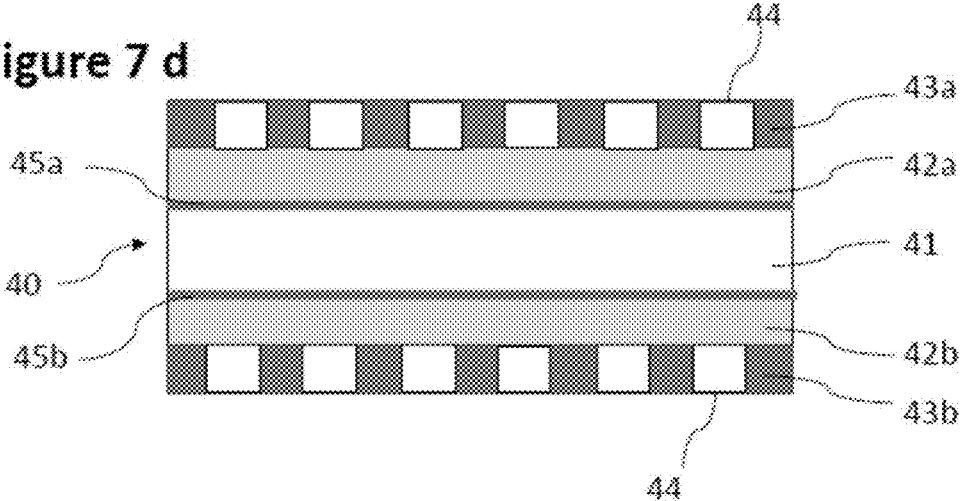

As explained above, reading out information from any of the data carriers shown in FIGS. 6 and 7 may be performed utilizing a standard SIM or SSIM device without any photoluminescent or fluorescent layer being embedded into the sample support. Thus, the system shown in FIGS. 1, 3 and 4 (without any photoluminescent or fluorescent layer being embedded into the sample support) may be employed for high-speed recording data and reading out information for any data carrier as shown in FIGS. 6 and 7.

What is claimed is:

1. A method of reading out information from a data carrier, the method comprising the following steps:
    providing a saturated structured-illumination microscopy (SSIM) device or a structured-illumination microscopy (SIM) device, the device having a sample support comprising a layer of a photoluminescent material;
    providing a data carrier, the data carrier comprising a transparent ceramic substrate and a coating layer provided on the transparent ceramic substrate, wherein the material of the coating layer is different from the material of the ceramic substrate, and wherein the coating layer comprises a plurality of recesses encoding information;
    placing the data carrier on the layer of photoluminescent material of the sample support;
    acquiring SIM or SSIM images from the layer of photoluminescent material of the sample support through the data carrier; and
    processing the SIM or SSIM images in order to decode the information encoded on the data carrier.

2. The method of claim 1, wherein the data carrier is placed on the layer of photoluminescent material of the sample support with the coating layer facing the layer of photoluminescent material of the sample support.

3. The method of claim 1, wherein the surface of the layer of photoluminescent material of the sample support and the surface of the data carrier facing the layer of photoluminescent material of the sample support are substantially planar with a maximum gap between the surface of the layer of photoluminescent material of the sample support and the surface of the data carrier facing the layer of photoluminescent material of the sample support being at most 10 nm.

4. The method of claim 3, wherein the maximum gap between the surface of the layer of photoluminescent material of the sample support and the surface of the data carrier facing the layer of photoluminescent material of the sample support is at most 2 nm.

5. The method of claim 1, wherein each recess in the coating layer has a depth which is substantially equal to the thickness of the coating layer.

6. The method of claim 1, wherein each recess in the coating layer has a depth which is greater than the thickness of the coating layer.

7. The method of claim 1, wherein the thickness of the coating layer is at most 100 nm.

8. The method of claim 1, wherein the thickness of the coating layer is at most 10 nm.

9. The method of claim 1, wherein the thickness of the ceramic substrate is at most 200 µm.

10. The method of claim 1, wherein the thickness of the ceramic substrate is at most 50 µm.

11. The method of claim 1, wherein the maximum dimension of the cross-section of each recess perpendicular to its depth is at most 250 nm.

12. The method of claim 1, wherein the maximum dimension of the cross-section of each recess perpendicular to its depth is at most 100 nm.

13. The method of claim 1, wherein the maximum dimension of the cross-section of each recess perpendicular to its depth is at most 30 nm.

14. The method of claim 1, wherein providing an SIM or SSIM device having a sample support comprising a layer of a photoluminescent material comprises providing a standard SIM or SSIM device having a sample support and mounting the layer of photoluminescent material on the sample support.

15. The method of claim 1, wherein the layer of photoluminescent material is a photoluminescent crystal.

16. The method of claim 1, wherein a light reflecting layer is present between the sample support and the layer of photoluminescent material.

17. The method of claim 16, wherein the photoluminescent material exhibits an excitation maximum at a first wavelength and an emission maximum at a second wavelength and wherein the light reflecting layer has a reflectance at 90° of at least 80% light having the first wavelength and/or for light having the second wavelength.

18. The method of claim 16, wherein the photoluminescent material exhibits an excitation maximum at a first wavelength and an emission maximum at a second wavelength and wherein the light reflecting layer has a reflectance at 90° at least 95% for light having the first wavelength and/or for light having the second wavelength.

19. A system for reading out information from a data carrier, wherein the data carrier comprises a transparent ceramic substrate and a coating layer provided on the transparent ceramic substrate, wherein the material of the coating layer is different from the material of the ceramic substrate, and wherein the coating layer comprises a plurality of recesses encoding information, the system comprising:
- a saturated structured-illumination microscopy (SSIM) device or a structured-illumination microscopy (SIM) device, the device having a sample support comprising a layer of a photoluminescent material, wherein the data carrier is configured to be placed on the layer of photoluminescent material, wherein the system is configured to acquire SIM or SSIM images from the layer of photoluminescent material of the sample support through the data carrier; and
- a processor adapted for processing the SIM or SSIM images in order to decode the information encoded on the data carrier.

* * * * *